United States Patent
Yousaf et al.

(10) Patent No.: US 10,530,691 B2
(45) Date of Patent: Jan. 7, 2020

(54) METHOD AND SYSTEM FOR MANAGING DATA TRAFFIC IN A COMPUTING NETWORK

(71) Applicant: NEC Laboratories Europe GmbH, Heidelberg (DE)

(72) Inventors: Faqir Zarrar Yousaf, Leimen (DE); Marco Liebsch, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 39 days.

(21) Appl. No.: 15/739,167

(22) PCT Filed: Jun. 25, 2015

(86) PCT No.: PCT/EP2015/064374
§ 371 (c)(1),
(2) Date: Dec. 22, 2017

(87) PCT Pub. No.: WO2016/206742
PCT Pub. Date: Dec. 29, 2016

(65) Prior Publication Data
US 2019/0081894 A1 Mar. 14, 2019

(51) Int. Cl.
*H04L 29/06* (2006.01)
*H04L 12/747* (2013.01)
(Continued)

(52) U.S. Cl.
CPC ............ *H04L 45/742* (2013.01); *H04L 45/38* (2013.01); *H04L 45/745* (2013.01);
(Continued)

(58) Field of Classification Search
CPC ..... H04L 45/742; H04L 69/22; H04L 49/354; H04L 47/31; H04L 47/2441; H04L 45/745; H04L 47/2425; H04L 67/00; H04L 45/38
See application file for complete search history.

(56) References Cited

U.S. PATENT DOCUMENTS 7,610,330 B1 * 10/2009 Quinn ................... H04L 45/02
709/201
9,769,065 B2 * 9/2017 Manghirmalani .... H04L 43/028
(Continued)

FOREIGN PATENT DOCUMENTS

WO        WO 03028341 A2      4/2003

OTHER PUBLICATIONS

Homma K Naito D R Lopez Telefonica I+D M Stiermerling NEC/H-DA D Dolson Sandvine A Gorbunov Nokia N Leymann S: "Analysis on Forwarding Methods for Service Chaining; draft-homma-sfc-forwarding-methods-analysis-02.txt", Analysis on Forwarding Methods for Service Chaining; Draft-Homma-SFC-Forwarding-Methods-Analysis-02.TXT, Internet Engineering Task Force, IETF; Standardworkingdraft, Internet Society (ISOC) 4, RUE DES Falaises CH-1205 Geneva, Switzerland, Jun. 8, 2015 (Jun. 8, 2015), pp. 1-31, XP015106579.

*Primary Examiner* — Jay P Patel
(74) *Attorney, Agent, or Firm* — Leydig, Voit & Mayer, Ltd.

(57) ABSTRACT

A method for managing data traffic in a computing network includes determining, by a determining function, processing information for processing one or more packets of an identified flow; stripping header information from the one or more packets of the identified flow by a stripping function; adding tag information to the one or more packets of the identified flow by a tag adding function; storing a mapping between the tag information and the header information in a cache by a mapping function, and processing the one or more packets of the identified flow by the one or more network functions according to the determined processing information. The one or more network functions query the cache using the tag information to retrieve information
(Continued)

associated with the tag information from the cache if required to process the one or more packets.

15 Claims, 6 Drawing Sheets

(51) Int. Cl.
    *H04L 12/721*     (2013.01)
    *H04L 12/741*     (2013.01)
    *H04L 12/851*     (2013.01)
    *H04L 12/833*     (2013.01)
    *H04L 12/931*     (2013.01)

(52) U.S. Cl.
    CPC ...... *H04L 47/2425* (2013.01); *H04L 47/2441* (2013.01); *H04L 47/31* (2013.01); *H04L 49/354* (2013.01); *H04L 69/22* (2013.01)

(56) References Cited

U.S. PATENT DOCUMENTS

| | | | |
|---|---|---|---|
| 9,787,567 B1* | 10/2017 | Mehta | H04L 41/0806 |
| 10,148,577 B2* | 12/2018 | Guichard | H04L 45/74 |
| 10,237,379 B2* | 3/2019 | Kumar | H04L 12/4641 |
| 2004/0179508 A1* | 9/2004 | Thubert | H04L 29/06 370/349 |
| 2008/0172497 A1* | 7/2008 | Mohan | H04L 12/4616 709/249 |
| 2012/0120955 A1* | 5/2012 | Vissers | H04L 12/413 370/392 |
| 2014/0092906 A1* | 4/2014 | Kandaswamy | H04L 45/38 370/392 |
| 2015/0124815 A1 | 5/2015 | Beliveau et al. | |
| 2016/0212048 A1* | 7/2016 | Kaempfer | H04L 45/745 |
| 2016/0241436 A1* | 8/2016 | Fourie | H04L 47/2425 |

* cited by examiner

METHOD AND SYSTEM FOR MANAGING DATA TRAFFIC IN A COMPUTING NETWORK

CROSS REFERENCE TO RELATED APPLICATIONS

This application is a U.S. National Stage Application under 35 U.S.C. § 371 of International Application No. PCT/EP2015/064374 filed on Jun. 25, 2015. The International Application was published in English on Dec. 29, 2016 as WO 2016/206742 A1 under PCT Article 21(2).

FIELD

The present invention relates to a method for managing data traffic in a computing network wherein the data traffic is transmitted in the computing network via flows of packets.

The present invention further relates to a system for managing data traffic in a computing network, wherein the data traffic is transmitted in the computing network via flows of packets.

BACKGROUND

In FIG. 1 a conventional 3GPP EPC network is shown: On the left of FIG. 1 base stations in the form of a LTE radio access network are connected to an evolved packet core EPC. Between an EPC packet data gateway and the packet data network, in FIG. 1 depicted as external network, a so-called SGi-LAN is implemented. Within the domain of SGi-LAN a technique or methodology referred to as service function chaining 'SFC' is usually implemented. In service function chaining, SFC, data packets are steered through a series of network functions, 'NF', where each NF will process/service the arriving packets to and from the EPC based on its functional and/or operational scope.

Conventionally and in the following the SFC domain comprises a classification function, a control function, a forwarding function and network function entities. The network functions provide network services, 'NS', to arriving flows of packets. When flows are arriving in the SFC domain they are classified by a classification function 'CF', based on some policy or rule that will determine the service (s) that the flows require. The classification may be based on detecting traffic type or application type, i.e. the classification function determines the service chain 'SC'. Based on the service requirements a control function will create a network function forwarding graph, 'NFFG', for the respective flow(s). The NFFG lists the relevant network functions NF in the service chain SC that are required to provide a range of services to the respective flows. The NFFG also specifies the order of a chain in which these networks functions NF will be visited by the packets of the respective flows. The length of the service chains may vary depending on the flows' service requirements. The network functions can be hosted on specific physical nodes or they can be virtualized. When being virtualized they are generally referred to as virtualized network function, 'VNF', and the NFFG is referred to a virtual NFFG, 'VNFFG', and the overall service provided by a SFC is referred to as network service, 'NS', as disclosed in the non-patent literature of ETSI Network Functions Virtualization (NFV), "Terminology for Main Concepts in NFV", ETSI GS NFV 003 V1.2.1, December 2014.

In FIG. 2 a conventional functional overview of the SFC domain is shown, i.e. a high level functional overview of an SFC domain comprising a chain of virtual network functions VNF1 to VNF4 is depicted in FIG. 2. For the routing of packets from one VNF to the next VNF in the chain, the control function translates the VNFFG into determining a Network Path, 'NP', from which forwarding rules are derived. These rules are then communicated by the control function towards the forwarding function, 'FF', which is part of the transport layer. The FF stores the forwarding rules in a forwarding table. In its simplest form the forwarding rule will specify the egress ports for packets arriving on ingress ports. The FF is responsible for steering traffic to the next hop VNF in the NP or service chain, 'SC'. The FF will identify the packet, for example based on its header information, and forward it to the egress port specified in the forwarding table, from where the packet will be delivered to a next hop VNF or a FF that may in turn forward the packet to the next VNF in the chain.

The packet forwarding may be done based on the original packet header or a transport header 'TH', which may be appended to the original packet header where the TH may be a MPLS label, GRE header, VxLAN type header or the like or be a simple tag or label that may identify the service chain or flow as for example disclosed in the non-patent literature of S. Homma et al, "Analysis on Forwarding Methods for Service Chaining, draft-homma-sfc-forwarding-methods-analysis-01, Jan. 23, 2015.

Each VNF will then process/service the arriving packets based on its functional/operational scope before passing the packets again to a FF to steer it to the next hop VNF in the chain. In this way packets of flows are steered through a chain of multiple VNFs before it gets forwarded to its destination.

However, the traffic load in the SFC domain is very high as most of the traffic entering the mobile core network converges in the SGi-LAN as shown in FIG. 1. Protocol header, for example TCP/UDP and IP of each packet that goes through a service chain SC will be processed by each network function NF in the chain for local delivery to identify a flow and to select the associated processing rules to process the packet as per function's operational and functional scope. This results in processing delay which gets compounded with every packet that goes through a service chain.

A further disadvantage—besides processing overhead—is additional overhead which may also be incurred as the packets entering the SFC domain will be appended with an additional header or tag as disclosed in the non-patent literature of S. Homma et al, "Analysis on Forwarding Methods for Service Chaining, draft-homma-sfc-forwarding-methods-analysis-01, Jan. 23, 2015. Such an additional header or tag is used to uniquely distinguish between packets belonging to particular flows. These additional tags enable a forwarding function to steer the packets belonging to a particular flow through the respective service chains.

Further some intermediate virtual network functions VNFs may add metadata to a packet that may be required by the subsequent virtual network functions VNFs in the service chain SC and this overhead in addition to the packet's own header will increase the packet size thereby increasing the likelihood of the packet size to exceed the MTU size. Consequently this will add additional complexity of managing packet fragmentation and reassembly and, considering the high traffic volume in the SGi-LAN, this additional overhead will also increase the load in the SFC domain.

SUMMARY

In an embodiment, the present invention provides a method for managing data traffic in a computing network, wherein the data traffic is transmitted in the computing network via flows of packets, and wherein packets are processed by one or more network functions. The method includes determining, by a determining function, processing information for processing one or more packets of an identified flow; stripping header information from the one or more packets of the identified flow by a stripping function; adding tag information to the one or more packets of the identified flow by a tag adding function; storing a mapping between the tag information and the header information in a cache by a mapping function, and processing the one or more packets of the identified flow by the one or more network functions according to the determined processing information. The one or more network functions query the cache using the tag information to retrieve information associated with the tag information from the cache if required to process the one or more packets.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
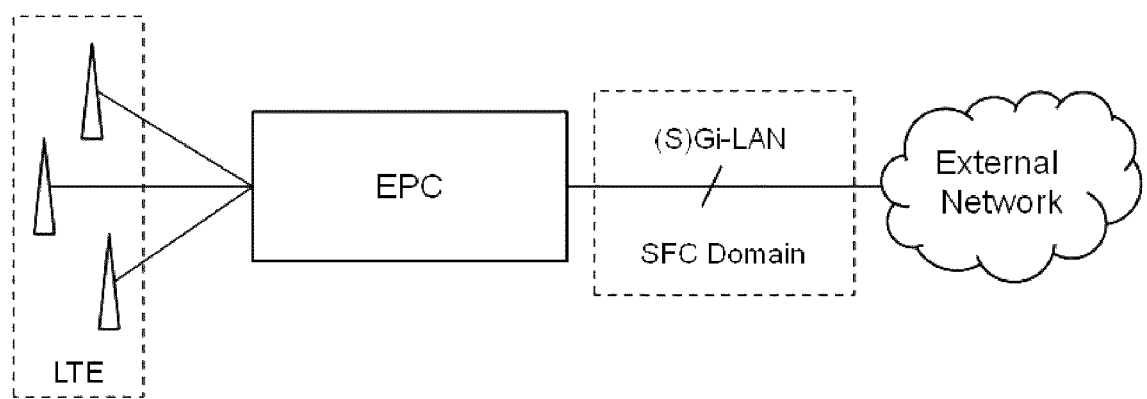
FIG. 1 shows a conventional 3GPP network schematically.

Although applicable to any kind of network, the present invention will be described with regard to a 3GPP EPC network.

Embodiments of the invention reduce the protocol header processing overhead of packets and eliminate or at least reduce packet fragmentation and reassembly, e.g. in the SFC domain, to improve resource utilization and to reduce the byte load in SFC domain.

In an embodiment the present invention provides a method for managing data traffic in a computing network, wherein the data traffic is transmitted in the computing network via flows of packets, and wherein the one or more packets are processed by one or more network functions, wherein:

a) processing information for processing said one or more packets of an identified flow is determined by a determining function, b) header information is stripped from said one or more packets by a stripping function, c) tag information is added to said one or more packets by a tag adding function, d) a mapping between said tag information and said header information is stored in a cache by a mapping function and e) said packets are processed by said one or more network functions according to said identified processing information, wherein said one or more network functions query said cache using said tag information to retrieve information associated with the tag information from said cache if required to process said one or more packets.

In a further embodiment, the present invention provides a system for managing data traffic in a computing network, wherein the data traffic is transmitted in the computing network via flows of packets, and wherein the packets are processed by one or more network functions provided by one or more network entities, the system including:

one or more input interfaces for receiving flows of packets, one or more output interfaces for outputting flows of packets at least one cache for storing information and one or more computing entities connected to at least one of the input and output interfaces and adapted to determine processing information for processing said packets of an identified flow, to strip header information from said one or more packets, to add tag information to said one or more packets, to store a mapping between said tag information and said header information in said cache and to process said one or more packets by said one or more network functions according to said identified processing information, wherein said one or more network functions query said cache using said tag information to retrieve header information associated with the tag information from said cache if required to process said one or more packets.

Embodiments of the present invention enable any additional headers that may not be of any relevance to the protocol or functional scope of the network function to be stripped off, cached and replaced by an identifier referred to as a tag. Thus the relevant payload is available to the network functions which not only reduces the packet size but also simplifies its structure aiding towards reduced packet processing by eliminating or reducing the need for the network functions to parse the successive headers before it can process the payload.

At least one embodiment provides the advantage to reduce the packet size by stripping it off any headers that may not be relevant for processing by the network functions for example in a SFC. This significantly reduces the processing overhead and associated costs such as header parsing by every network function for every packet.

Another advantage of embodiments of the present invention is to enable an elimination of a possibility of packet fragmentation and reassembly due to the fact that any extra header or metadata pertaining to a packet or flow is written in a cache and not to the packet itself.

A further advantage of at least one embodiment of the present invention is an optimized utilization of the resources such as computation, network, etc. consumed by the network functions. Further the byte load is reduced due to stripped off headers.

The term "flow" in connection with packets is to be understood in its broadest sense and is not limited to in particular the term "flow" according to the OpenFlow protocol. A flow may be, e.g., any kind of a group of information or information parts to be transmitted.

The term "entity" is to be understood in its broadest sense and is to be understood as any kind of physical or virtual computing entity or computing entities and may include, but is not limited to the following: an application running on a computer, a microprocessor, a single, dual, quad or octa-core processor or processors or the like or a computer, processor, or the like with a memory. Said application, computer or processor may have one or more interfaces, ports or the like for communication with other devices, entities, ports, interfaces or the like.

The term "function" is to be understood in its broadest sense and may include, but is not limited to any kind of computing entity which provides a corresponding function by an application or the like is hardcoded into a memory, processor, or the like.

Examples for network functions to be performed may be, but are not limited to Deep Packet Inspection, Firewall, Access Control List, Load balancing, Security, Video optimization, Transcoding, Compression, Parental control, Network Address Translation, etc.

Further features, advantages and further embodiments are described only become apparent in the following.

As a further step f) the tag information may be replaced by said corresponding header information of said cache after processing said one or more packets by all network functions, e.g. by a replacing function. This ensures that until the time the packets get processed by all network functions constituting a service chain the header is provided in its original structure if applicable with modified values due to processing by the network functions. Thus further processing within the network is enabled easily.

Said header information may be updated in the cache when a change is introduced by a network function. This enhances the flexibility: When a network function in the case a necessary change in the header, for example when providing updated values, for example TTL field, is introduced these can be also efficiently handled in the cache and can therefore be further provided to network functions further down in the network function service chain.

An additional transport header may be added to the tag information. An additional transport header enables the steering of packets efficiently, for example in the SFC domain by using the transport header for forwarding according to packet forwarding rules or protocol.

Additional metadata for a flow may be stored in the cache and associated with said tag information. Additional metadata or any other miscellaneous information pertaining to the flow can provide additional information for the network functions further enhancing an efficient handling of the data traffic and increasing the flexibility, allowing network functions to perform tasks of a greater scope.

After querying said cache with tag information the received header information may be locally cached by said network function initiating said query. Local caching avoids a repeated querying of the cache for every arriving packet of the same flow by the network function and thus efficiency is further enhanced.

A second cache may store at least part of the information of said cache said second cache being in sync with said cache. Said second cache reduces the exchange of transactions between the first cache of d) and network functions. Further the flexibility is enhanced since said second cache enables a distribution of flows and hence the workload between the network functions and the caches.

Said cache may be distributed among said network functions. This further reduces the workload by enabling a distribution of flows between multiple instances of virtual network functions and virtual distributed second cache.

Each network function may cache the mapping for flows processed by said corresponding network function. This avoids repeated querying of the cache of corresponding flows by every arriving packet.

Said cache of d) may comprise multiple caches, wherein network functions are assigned to different groups, wherein each of said groups uses a different cache out of said multiple caches. This further enhances caches to be used by groups of network functions enhancing the flexibility and an efficient handling.

f) may be performed by a network function. This has the advantage that flows and the corresponding workload can be distributed between multiple virtual network functions for example.

At least one network function can be virtualized. Virtualizing has the advantage to distribute corresponding processing load and network traffic. Further flexibility in terms of using of computing resources, network resources, memory resources or the like is enhanced.

A processing scope of the network functions may be determined, and based on said processing scope, said header information are stripped off. For instance a classifying function determines the processing scope of the respective network functions and a highest protocol level at which the packets of the flows are processed. Then any other header above that protocol level will be stripped off the said stripping function. This enables an efficient handling leaving only the protocol levels for the headers necessary for processing.

Said one or more computing entities may be adapted to replace the tag information by said corresponding header information of said cache. This ensures that until the time the packets get processed by all network functions constituting a service chain the header is provided in its original structure if applicable with modified values due to processing by the network functions. Thus further processing within the network is enabled easily.

Said system may further comprise a controller adapted to control flows according to service requirements by guiding packets of flows to network function for processing according to the service requirement and/or to host said cache. This enables the centralized handling of the packets as well as of the mapping stored in said cache. The said controller may extend its control via the forwarding function FF.

FIG. 1 shows a conventional 3GPP network schematically. In FIG. 1 a SFC domain with respect to a 3 GPP EPC network is shown. FIG. 1 was described above.

Figure 2:
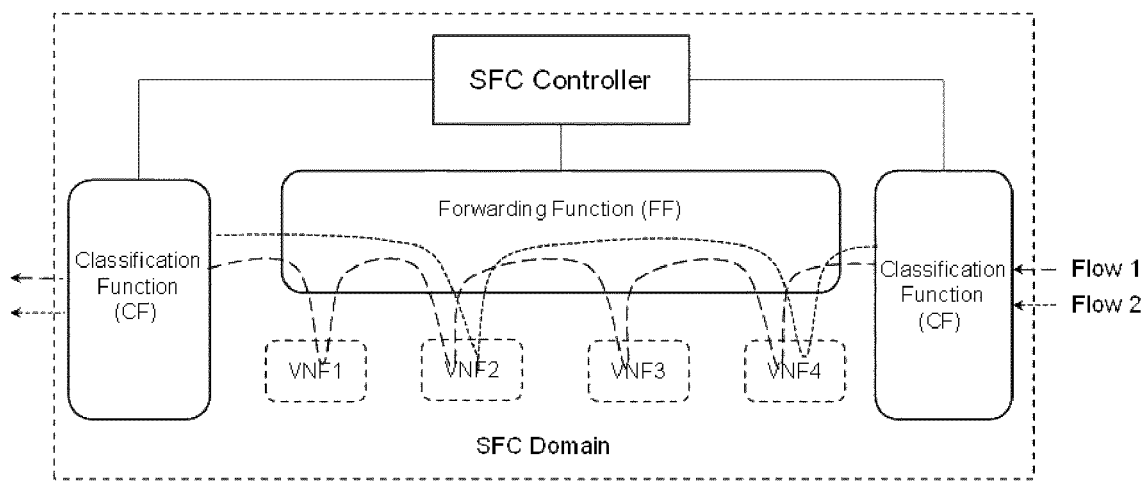
FIG. 2 shows, in more detail, an SFC domain shown in FIG. 1.

FIG. 2 shows in more detail the SFC domain shown in FIG. 1. In FIG. 2 a conventional functional overview of the SFC domain is shown. FIG. 2 was also described above.

Figure 3:
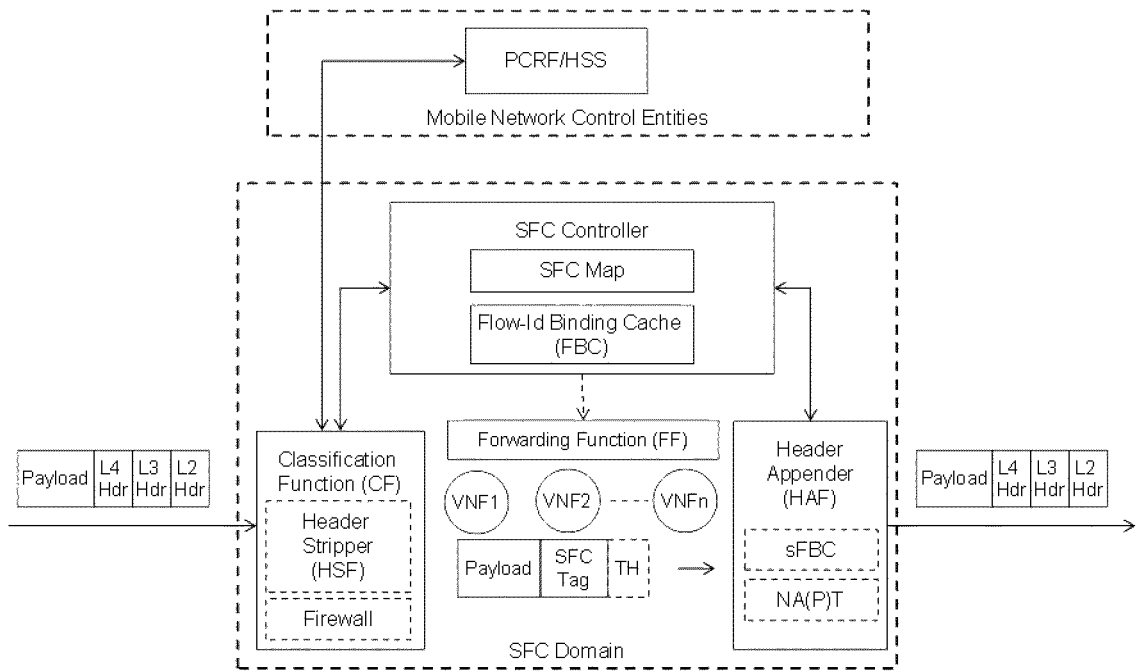
FIG. 3 shows a system and method according to an embodiment of the present invention.

FIG. 3 shows a system and method according to an embodiment of the present invention. In FIG. 3 a schematically conceptual overview of an embodiment of the method and of a system is shown.

The system comprises the following functional elements:
1. Classification function CF—identifies and classifies a flow based on the flow's packet header and/or SLA information. It also determines the set of services required by that flow and the order in which the services shall be applied. The classification function CF may also be realized as a virtual function.
2. Header stripping function HSF—strips an incoming packet of its headers to expose the relevant payload. It will replace the stripped header with a tag and an additional transport header TH for steering of packets in the service function chaining SFC domain. The header stripping function HSF can also comprise network function of address/port filtering (Firewall). Load balancer (not shown in FIG. 3) dispatches traffic between multiple classification function CF/header stripping function HSF instances. Hence, classifier is overloaded to classify but already filter traffic according to information which is stripped then by the header stripping function HSF (hence not available in the chain). A virtualized instance of this function is referred to as virtualized header stripping function VHSF.

3. Header appending function HAF—appends an outgoing packet with its original header or an updated header in case the header appending function HAF is overloaded to apply policies for NA(P)T. A virtualized instance of this function is referred to as virtualized header appending function VHAF.

4. Flow-id binding cache FBC—a master cache that maintains for all flows a mapping between the tag-id (that identifies the flow) and the packet's stripped header information. It may be co-located within the service function chaining SFC controller or it may be realized as a separate cache.

5. Secondary flow-id binding cache sFBC—contains a copy of the subset entries of the Flow-id Binding Cache FBC. It may be co-located with the header appending function HAF or it may be realized as a distributed cache.

6. Service function chaining SFC Map—specifies a complete map for a service function chaining SFC indicating the associated flows, the VNFFG and the associated VHAF/secondary flow-id binding cache sFBC.

A packet arriving at the service function chaining SFC domain will first get identified, classified and its service requirements determined by said classification function CF. The classification can be based on operator specified policy/rules that the classification function CF can access/derive from the information provided by the mobile network's control plane entity; such as a PCRF/HSS in 3GPP based mobile networks. The classification policy/rules will take into account the information in the packet header(s), for example L2-L4 header information, that will enable the system to identify the flow, its application type and determine the flows' SLA. Based on this, the classification function CF will determine the service function chaining SFC by deriving the VNFFG for the flow.

The VNFFG identifies the relevant virtualized network functions VNFs in the service chain SC and also specifies their respective order in the service chain SC. Once the VNFFG is computed, classification function CF will determine the processing scope of the respective virtualized network functions VNFs and determine the highest protocol level at which the flows' packets will be processed.

Any other header above that protocol level will be stripped off by the header stripping function HSF, which can either be collocated with the classification function CF or can be a virtualized functional entity (i.e., virtual header stripping function VHSF) proceeding the classification function CF. The classification function CF (or the header stripping function HSF if realized as a separate function) will generate and append a unique service function chaining SFC header, referred to as a tag. This tag uniquely identifies a flow from other flows and all packets that belong to the same flow will be appended with the same tag. A standard TH will also be appended for transport of traffic by the forwarding functions FFs within the service function chaining SFC domain. The TH can either be standard MPLS or GRE header or it can be a VxLAN based encapsulation that is identifiable by the forwarding functions FFs. A simplified tag could be defined that is not only also used to identify the flow and the service chain SC but it may also be used by the forwarding function FFs in the underlying transport network of the service function chaining SFC domain for traffic steering; whereas the scope/format of this tag will be unique to the service function chaining SFC domain and used by the forwarding function FFs for steering the packets from one virtualized network function VNF to the next virtualized network function VNF in the service function chaining SFC specified for the flow. For instance the latter may have an impact on software-defined network SDN based controllers and switches where they need to understand and process the tag. In its simplest form, the tag may comprise a unique-id for flow identification and the payload size so that the processing virtualized network function VNF may know the position of the payload.

Afterwards, the classification function CF will inform the service function chaining SFC controller of the tag-id, TH and the VNFFG that it has derived for the flow, which in turn will instantiate the relevant virtualized network functions VNFs in the VNFFG and will configure the packet forwarding rules in the underlying forwarding functions FFs based on the tag-id or TH. For this purpose, the service function chaining SFC controller may maintain a service function chaining SFC Map that identifies the flows (identified by the tag-id) associated with a specific service function chaining SFC, which in turn is characterized by the VNFFG and also indicates the (V)HAF and secondary Flow-id Binding Cache sFBC of which it is the member of. This is illustrated in Table 1 where, for example, SFC-1 is composed of VNF1→VNF2→VNF3→VNF7 and 3 flows, identified by tag-id 1, 3 and 5, share this service chain SC. It also indicates that (V)HAF-1 and sFBC-1 is shared between SFC-1 and SFC-2.

TABLE 1

Overview of the service function chaining SFC Map
service function chaining SFC Map

| SFC-Id | Tag-id | VNFFG | (V)HAF-id | sFBC-id |
|---|---|---|---|---|
| 1 | [1, 3, 5] | [VNF1; VNF2; VNF3; VNF7] | (VHAF)-1 | sFBC-1 |
| 2 | [9, 11, 12] | [VNF1; VNF4; VNF5; VNF7] | (VHAF)-1 | sFBC-1 |
| 3 | [2, 8, 10] | [VNF'1; VNF2; VNF'3; VNF'7] | (VHAF)-2 | sFBC-2 |
| 4 | [4, 6, 7] | [VNF'4; VNF3; VNF'5] | (VHAF)-2 | sFBC-2 |

The system of the embodiment also maintains a mapping between the packet's tag and its original header in a cache referred to as Flow-id Binding Cache (FBC), the conceptual overview of which is shown as Table 2:

TABLE 2

An associative FBC mapping the service function chaining
SFC Tag-id with the flow header information
Flow Id Binding Cache (FBC)

| Key | Value |
|---|---|
| SFC Tag-id | L2 Header Information<br>L3 Header Information<br>L4 Header Information |

TABLE 2-continued

An associative FBC mapping the service function chaining
SFC Tag-id with the flow header information
Flow Id Binding Cache (FBC)

| Key | Value |
|---|---|
| . | |
| . | |
| . | |
| | Lx Header Information |
| | Metadata |
| | Miscellaneous flow information |

The flow-id binding cache FBC can be realized as an associative container where the packet tag is used as a key to reference the packet's original header that has been stripped off by the (virtualized) header stripping function (V)HSF. Besides the header information, the flow-id binding cache FBC can also maintain any additional meta-information and/or any miscellaneous information pertaining to the flow. The flow-id binding cache FBC can be maintained/managed as part of the service function chaining SFC Controller (see FIG. 3), or it can also be realized as an external cache. The system may also comprise distributed instances of the Flow-id Binding Cache FBC, which maintain a copy of the subset of flow-id binding cache FBC entries, and is referred to as secondary Flow-id Binding Cache sFBC. FIG. 3 shows secondary Flow-id Binding Cache sFBC as part of (V)HAF and if it is external then the (V)HAF must have access rights to it. The underlying virtualized network functions VNFs have read/write access to both flow-id binding cache FBC and secondary Flow-id Binding Cache sFBC.

Figure 4:
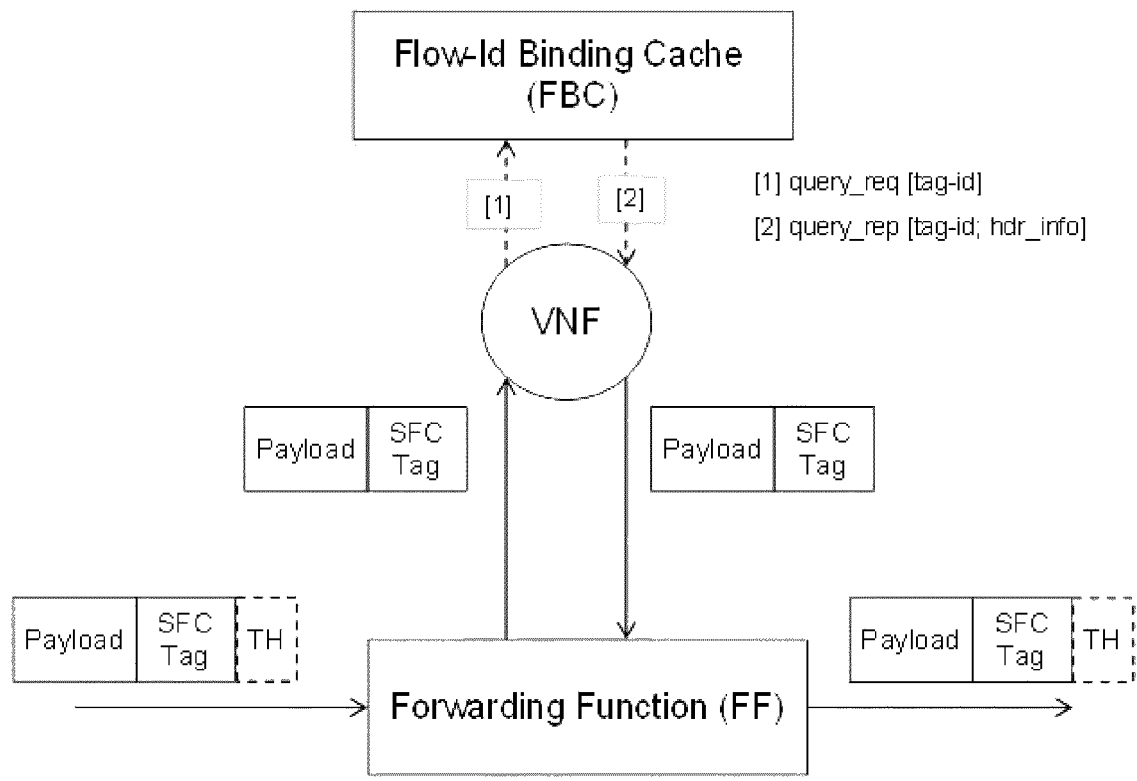
FIG. 4 shows part of a method according to an embodiment of the present invention.

FIG. 4 shows part of a method according to a further embodiment of the present invention. In FIG. 4 packet forwarding and processing in an overview is shown. It is also shown that a virtualized network function VNF sends query request, i.e. the quer_req message in FIG. 4 to the FBC to resolve the tag-id to the associated header information, which is then returned to the virtualized network function VNF in the reply message, i.e., query_rep message in FIG. 4.

The forwarding function FF will strip off the transport header TH and forward the packet (with the service function chaining SFC tag) to the next hop virtualized network function VNF in the service chain SC. The virtualized network function VNF will strip off the tag, process the payload, re-append the tag and send it down to the FF for steering it to the next virtualized network function VNF in the service chain SC or to its destination. In case the virtualized network function VNF requires header information for processing the packet, it will query the FBC to resolve the header information associated with the tag-id and perform the necessary processing. The virtualized network function VNF may also store the just queried header information in its local cache to avoid repeated querying of the FBC for every arriving packet of the same flow.

After the packet gets processed by the successive virtualized network functions VNFs in the service function chaining SFC, it is forwarded to the Header Appending Function (HAF) (see FIG. 3). Based on the tag-id, the HAF will query the FBC to resolve the header information associated with the tag-id, remove that tag and re-append (or re-encapsulate) the packet with the original protocol headers, adopting the original or updated values (e.g. for the TTL field). In order to avoid repeated querying of the FBC for header information resolution for every arriving packet, the HAF shall maintain the copy of the resolved header in a local cache, referred to as sFBC. The sFBC may also be realized as a distributed cache that can be accessed by the HAF. Once the flow (i.e., session) ends or times out, the corresponding entry in the FBC can be deleted and the service function chaining SFC controller can also signal the sFBC to remove the corresponding entry from its cache.

Figure 5:
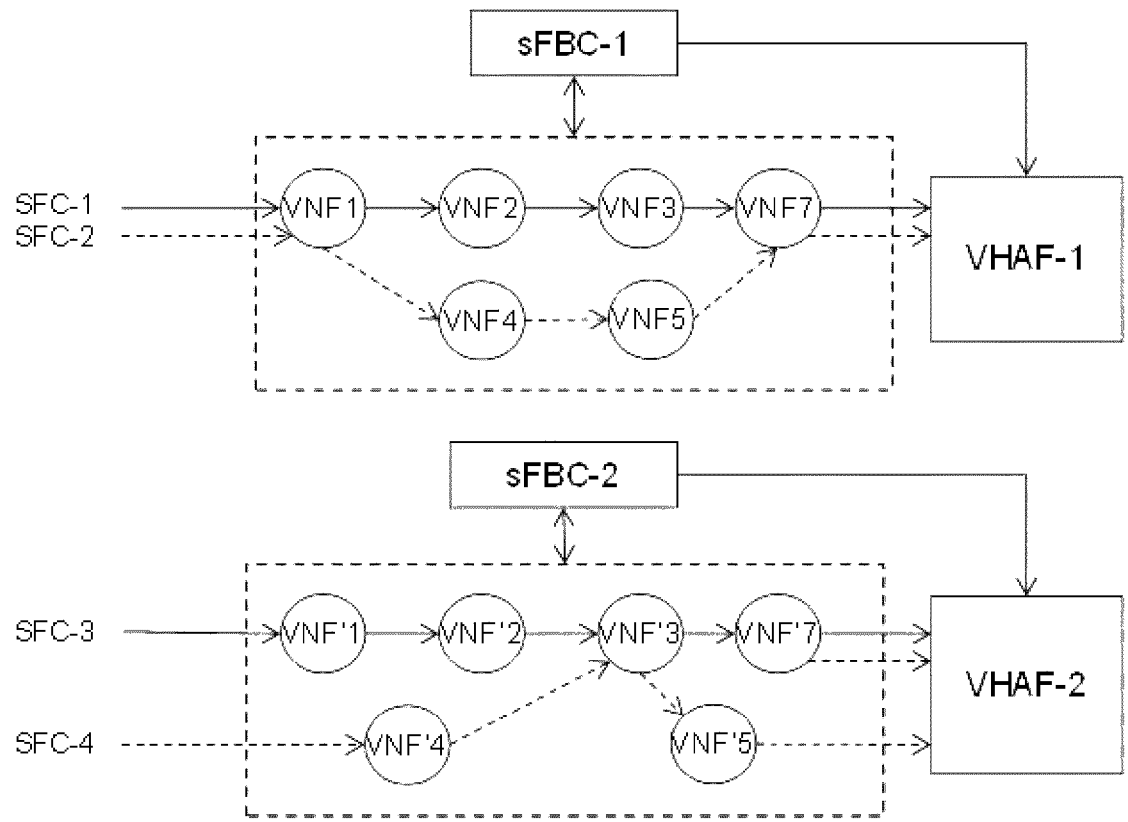
FIG. 5 shows part of a method according to an embodiment of the present invention.

FIG. 5 shows part of a method according to a further embodiment of the present invention. In FIG. 5 an example scenario is illustrating the utilization of VHAF and sFBC is shown. Here the HAF is realized as a virtualized network function VNF, i.e. as virtualized header appending function VHAF. This will have the advantage of distributing the flows and the workload between multiple instances of virtual header appending functions VHAF. In FIG. 5 the following is shown: there are 4 service function chainings SFCs and SFC-1 and SFC-2 are grouped under VHAF-1 and sFBC-1, while SFC-3 and SFC-4 are grouped under VHAF-2 and sFBC-2. The sFBC can also be co-located but here they are considered as distributed caches. The grouping or membership of service function chains SFCs to a particular instance of VHAF and sFBC is decided by the service function chaining SFC controller and indicated in the forwarding rules of the underlying FFs. Thus all flows belonging to any of these service function chains SFCs will be served by the respective VHAF and sFBC. The sFBC will only maintain the mapping of flows that are part of the member service function chains SFCs. In other words a sFBC will contain a subset of the FBC entries relevant to the member flows. All the virtualized network functions VNFs in the service function chaining SFC will have read/write access to their respective sFBC and the FBC, where the sFBCs will remain in sync with FBC for any changes that a particular virtualized network function VNF my cause in the header fields that has been stripped.

Figure 6:
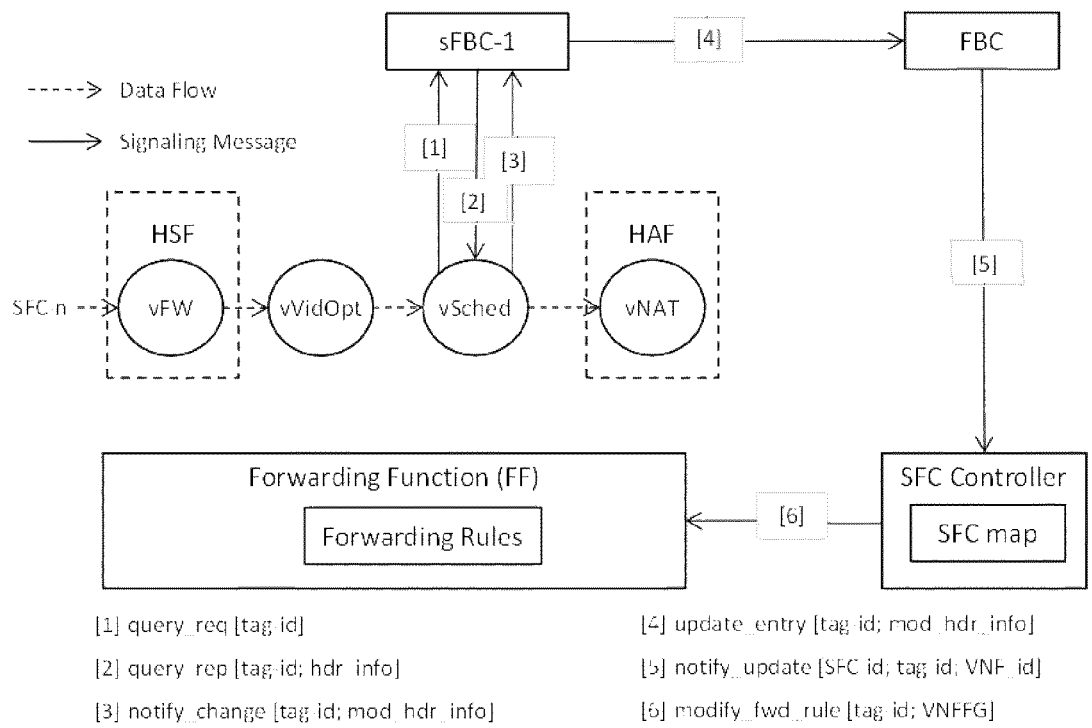
FIG. 6 shows part of a method according to an embodiment of the present invention.

FIG. 6 shows part of a method according to a further embodiment of the present invention. In FIG. 6 as schematical process overview for a virtualized scheduler function to modify a field entry of a stripped-off L3 header is shown. FIG. 6 shows a use case scenario for an intermediate virtual network function in the service chain that may need to encode the ECN codepoint in the IP header to reflect the state of congestion when a packet arrives. The service function chaining SFC of FIG. 6 is composed of a virtual firewall application function (vFW), a virtualized video optimizer function (vVidOpt), a virtualized traffic shaper/scheduler function (vSched) and a virtualized NA(P)T function (vNAPT) respectively. The flows that belong to this service function chaining SFC after being admitted by the vFW will be forwarded to vVidOpt function that will perform video optimization functions (such as transcoding, transrating, transizing, transmuxing etc.) on the packets of different flows. The vVidOpt will be able to differentiate between flows based on their header information that it resolved with the FBC using the tag-id as shown with reference to FIG. 4. The packets will then be forwarded to the vSched that will schedule between flows based on some scheduling algorithm and also detect congestion. In order to prioritize between flows for scheduling based on the header information, the vSched will need to resolve the header information (assume L3 header) associated with the tag-id of the incoming packets and store them in a local cache. Thus when the vSched receives the first packet for the flows, it will query the sFBC of the L3 header information based on the tag-id (message [1] in FIG. 6). The sFBC will respond to the query and provide a copy of the L3 header to the vSched function (message [2] in FIG. 6).

The vSched will store the L3 header information in its local cache and, based on its source and/or destination IP address, will identify the flow priority based on some pre-defined rules/policy. It could be that some flows may experience congestion in the vSched due to the presence of some high priority flows and/or high load. The vSched will thus need to notify the end-hosts of congestion by setting the Explicit Congestion Notification (ECN) codepoint in the IP header of flows that are low in the scheduling priority and hence experiencing delays. The vSched will thus notify the sFBC the change in the status of ECN bits in the DiffServ field of the IP header of relevant flows by sending a notification message. This notification message (message [3] in FIG. 6) will contain the tag-id and the modified L3 header information which is then used by the sFBC to update the corresponding entry in the cache. The sFBC will also notify the FBC of the change (message [4] in FIG. 6), which will update its corresponding entry. The FBC will then inform the service function chaining SFC controller of the changes made to the header information of particular flow(s) (message [5] in FIG. 6). The message [5] will indicate to the service function chaining SFC controller the SFC-id, the tag-id and the VNF-id that has modified the header information.

Depending on the control policy, the service function chaining SFC controller may decide to take necessary management actions to relieve the state of congestion by, for example, scaling up the vSched virtualized network function VNF instance by instantiating one or more additional vSched instance and distribute load between them. Such an action will require reassigning some flows to the newly instantiated instance(s) of vSched function, resulting in the changes in the service function chaining SFC map. The service function chaining SFC controller will thus update the corresponding entry in the service function chaining SFC map and will notify the forwarding function FF to modify the VNFFG for the respective flow identified by the tag-id (message [6] in FIG. 6). At the (V)HAF the packets will be re-appended with the modified header indicating the state of congestion to the end-hosts. Thus, upon the change in the state of congestion, the vSched instead of parsing and indicating the ECN codepoints in the header for every arriving packet will only do it once. Similarly any metadata information, for example introduced by the vVidOpt function, instead of being introduced to every packet needs to be written only once to the sFBC/FBC cache and then appended by the HAF to the outgoing packets.

Similarly changes to the TCP header fields can also be updated in the sFBCs and FBC in case of a virtualized proxy-TCP function. In other words any function that is required to update any field in the header that has been stripped away can employ the above method. An advantage of this is that such functions need to write the changes only once, i.e., for the first packet, while other packets will just pass through.

In another embodiment, the sFBC cache entries may be made part of the virtualized network functions VNFs instead of having them realize as a separate cache. The virtualized network functions VNFs thus will maintain their own local copy of the FBC cache for the relevant flows, and will keep its state in sync with the main FBC cache.

In summary in an embodiment the present invention provides a system enabling the stripping away of any access headers of a packet to expose payload relevant for the processing by multiple virtualized functions constituting a service chain, the system comprising:

1. A header stripping function removing the headers of the incoming packets and exposing the payload that the virtualized network functions VNFs, in a service function chaining SFC, need to process.
   a. The stripped header is replaced with an identifier, i.e. a tag-id, that identifies the packets of a flow. The stripped header is also bound to the identifier in a cache referred to as FBC.
   b. The FBC maintains a map of the tag-id with the header and meta-data information and/or any other related information.
2. A header appending function HAF re-encapsulating the payload of the outgoing packets with the original or modified header, where
   a. The original or modified header is accessed from the FBC, or a co-located sFBC, while using the tag-id as a reference key.
   b. The FBC cache can be central and there may be distributed instances of FBC cache, referred to as secondary FBC sFBC where each sFBC contains a sub-set of the FBC entries.
   c. The sFBC in combination with (V)HAF will reduce the exchange of transactions between the (V)HAF and the FBC.
3. The virtualized instances of HAF (i.e., VHAF) and distributed instances of FBC cache (i.e., sFBC) allowing the distribution of flows, and hence the workload, between multiple instances of VHAF and sFBC.
4. One time Header modification in the remote cache (FBC) and not directly on the packets.
5. One time recording/writing of headers modified by SF in the chain for every flow.

In a further embodiment the present invention provides a distribution of the FBC between the virtualized network function VNF of a chain where each virtualized network function VNF show and maintain their FBC entry for the member flows. This enables the virtualized networks VNF to have local read/write access to the header information of the corresponding flows identified by the appended tag.

In a further embodiment the present invention provides a method comprising the following steps:
1. Classification of flows and identifying them to a service function chaining SFC, to enable service function chains SFCs.
2. Stripping off the header information and to expose payload that is of relevance to the virtualized network functions VNFs in a service chain SC.
3. Replacing the stripped header with an identifier (i.e., a tag) and storing the tag with the associated header in an associative cache, where the header information can be accessed (read/write access) based on the tag-id.
4. The packets are forwarded from one virtualized network function VNF to the next by the underlying transport network, based on the transport header complying with the underlying transport protocol.
5. Each visiting virtualized network function VNF in the chain will identify the packet based on its tag-id by querying the associative cache that maintains a binding between the tag-id and the header information.
6. Any changes that a virtualized network function VNF may want to introduce to a packet header is done once and written to the relevant entry in the cache.
7. The packets of a flow are stripped off the tag and appended with the original/modified header before leaving the service function chaining SFC domain.

At least one embodiment of the present invention provides at least one of the following:

1. An ability to accumulate the header modifications made by several SF in the chain and apply them once in the (V)HAF.
2. An ability to reduce the packet size by stripping it off any headers that may not be relevant for processing by the virtualized network functions VNFs in a service function chaining SFC. This will significantly reduce the processing overhead and associated costs, such as header parsing, by every virtualized network function VNF for every packet.
3. A system still being able to allow modifying changes in the stripped header field(s). Such a modification can only be performed once for a packet and does not need to be repeated for every incoming packet.

At least one embodiment provides at least one of the following advantages:
1. Reduction of processing overhead of packets in the service function chaining SFC domain by significantly reducing the header parsing by every virtualized network function VNF in the chain for every individual packet.
2. Elimination of the possibility of packet fragmentation and reassembly in the service function chaining SFC domain due to the fact that any extra header/meta-data pertaining to a packet/flow is written in a FBC and not to the packet itself
3. Optimized utilization of the resources, such as compute, network etc, consumed by the virtualized network functions VNFs.
4. Reduced byte load in the service function chaining SFC domain due to stripped off headers.

Embodiments of the invention or parts of the embodiments can be used or provided virtualized and/or non-virtualized.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for managing data traffic in a computing network, wherein the data traffic is transmitted in the computing network via flows of packets, and wherein packets are processed by one or more network functions, the method comprising:

a) determining, by a determining function, processing information for processing one or more packets of an identified flow;
b) stripping header information from the one or more packets of the identified flow by a stripping function;
c) adding tag information to the one or more packets of the identified flow by a tag adding function;
d) storing a mapping between the tag information and the header information in a cache by a mapping function, and
e) processing the one or more packets of the identified flow by the one or more network functions according to the determined processing information,
wherein the one or more network functions query the cache using the tag information to retrieve information associated with the tag information from the cache if required to process the one or more packets.

2. The method according to claim 1, further comprising:
f) after processing said one or more packets by all network functions, the tag information is replaced by said corresponding header information of said cache.

3. The method according to claim 1, wherein the header information is updated in the cache when a change is introduced by a network function.

4. The method according to claim 1, wherein an additional transport header is added to the tag information.

5. The method according to claim 1, wherein additional metadata for a flow is stored in the cache and associated with the tag information.

6. The method according to claim 1, wherein after querying the cache with tag information the received header information is locally cached by a network function initiating the query.

7. The method according to claim 1, wherein a second cache stores at least part of the information of the cache, the second cache being in sync with the cache.

8. The method according to claim 7, wherein the cache and/or the second cache is distributed among the one or more network functions.

9. The method according to claim 1, wherein each network function caches the mapping for flows processed by a corresponding network function.

10. The method according to claim 1, wherein the cache of d) comprises multiple caches, wherein network functions are assigned to different groups, and wherein each of the different groups uses a different cache of the multiple caches.

11. The method according to at least claim 2, wherein f) is performed by a network function.

12. The method according to claim 1, wherein at least one network function is virtualized.

13. The method according to claim 1, wherein a processing scope of the one or more network functions is determined, and based on the processing scope, the header information is stripped off.

14. A system for managing data traffic in a computing network, wherein the data traffic is transmitted in the computing network via flows of packets, and wherein one or more packets are processed by one or more network functions provided by one or more network entities, the system comprising:
one or more input interfaces for receiving flows of packets;
one or more output interfaces for outputting flows of packets;
at least one cache for storing information; and one or more computing entities connected to at least one of the one or more input interfaces and the one or more output interfaces and adapted to:

determine processing information for processing one or more packets of an identified flow, strip header information from the one or more packets of the identified flow, add tag information to packets, store a mapping between the tag information and the header information in the cache, and process the one or more packets of the identified flow by the one or more network functions according to the identified processing information, wherein the one or more network functions query the cache using the tag information to retrieve information associated with the tag information from the cache if required to process the one or more packets of the identified flow.

15. The system of claim 14, wherein the system further comprises a controller adapted to control flows according to service requirements by guiding packets of flows to network functions for processing according to service requirements and/or to host the cache.

* * * * *